(No Model.) 3 Sheets—Sheet 2.
L. H. NASH.
COMBINED GAS ENGINE AND AIR COMPRESSOR.
No. 278,168. Patented May 22, 1883.
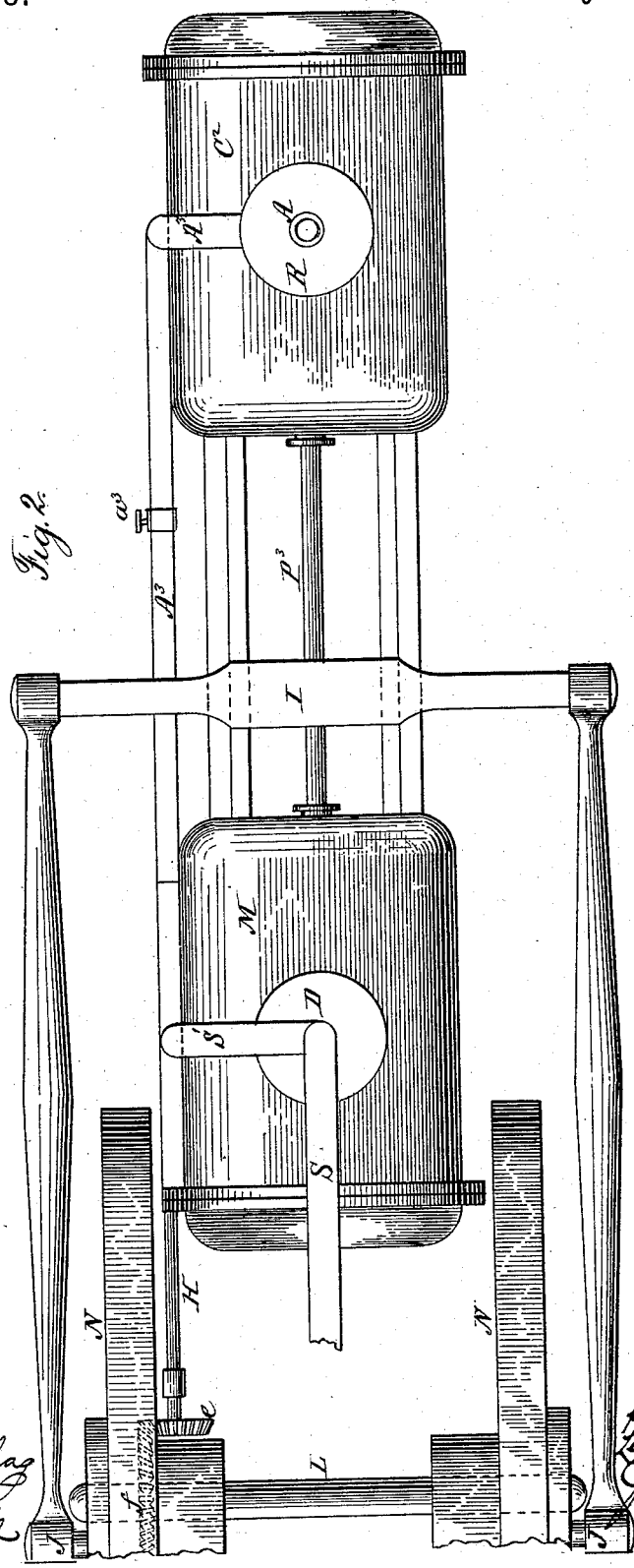

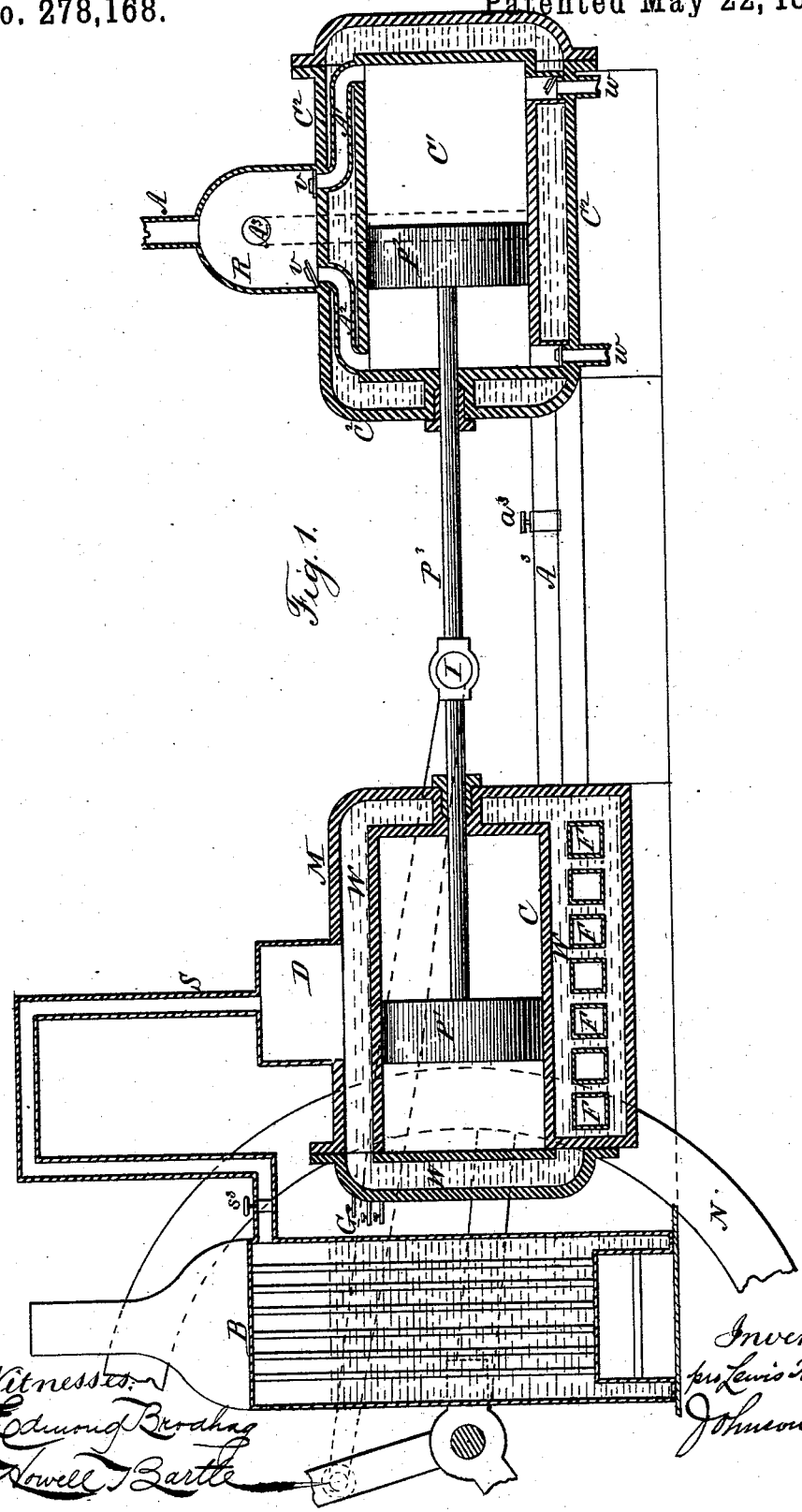

(No Model.) 3 Sheets—Sheet 3.
L. H. NASH.
COMBINED GAS ENGINE AND AIR COMPRESSOR.
No. 278,168. Patented May 22, 1883.
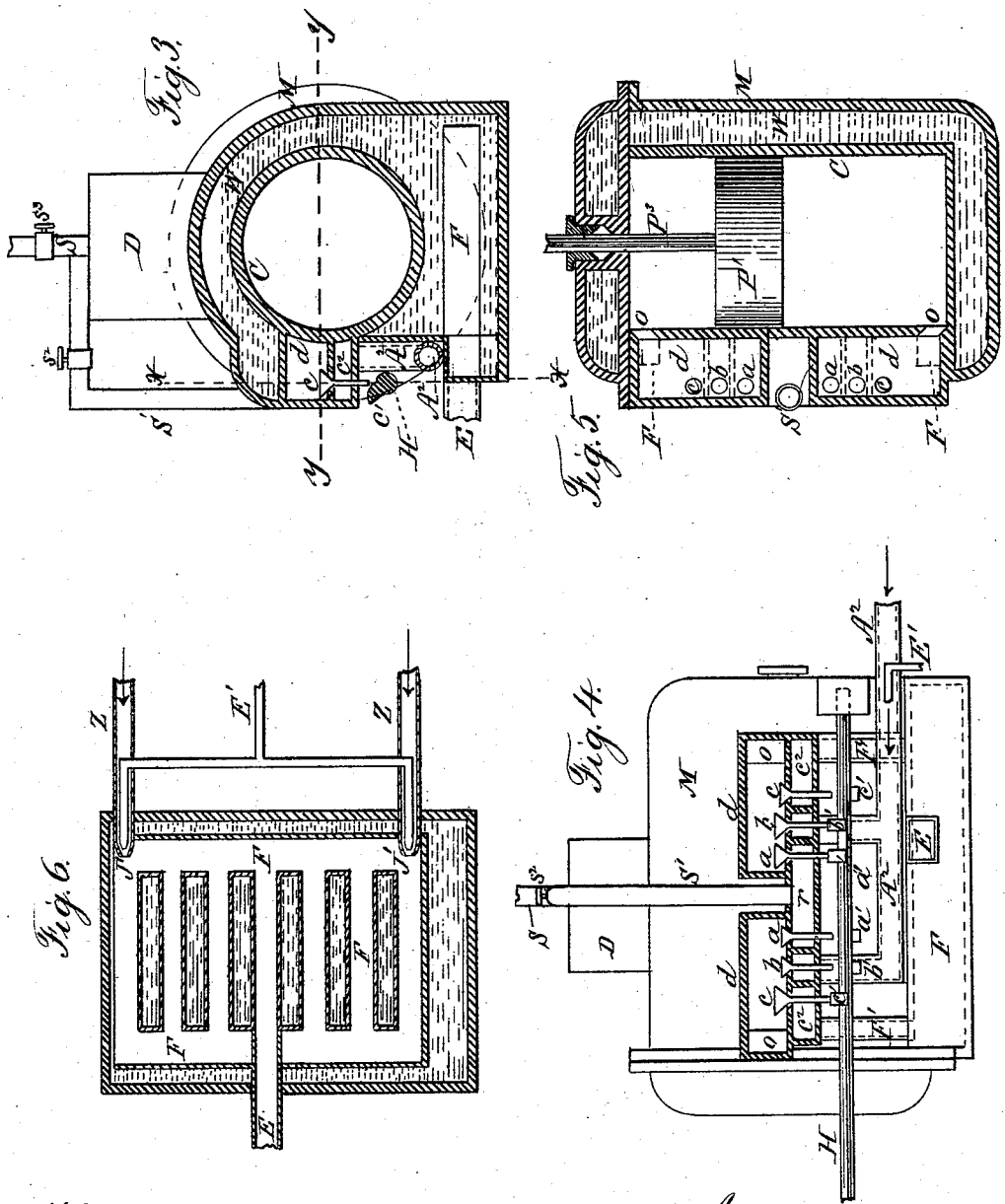

UNITED STATES PATENT OFFICE.

LEWIS H. NASH, OF BROOKLYN, ASSIGNOR TO THE NATIONAL METER COMPANY, OF NEW YORK, N. Y.

COMBINED GAS-ENGINE AND AIR-COMPRESSOR.

SPECIFICATION forming part of Letters Patent No. 278,168, dated May 22, 1883.

Application filed September 9, 1882. (No model.)

*To all whom it may concern:*

Be it known that I, LEWIS HALLOCK NASH, a citizen of the United States, residing at Brooklyn, in the county of Kings and State of New York, have invented new and useful Improvements in a Combined Gas-Engine and Air-Compressor, of which the following is a specification.

The invention herein relates to improvements in engines operated by the expansive force of air in contact with the combustion of a gaseous fuel ignited within the power-cylinder.

In another application for a patent I have described a gas-engine having its cylinder combined with a boiler-incasement in which a pressure of steam is maintained by the heat of radiation and conduction from the cylinder and the heat of the waste gases ejected by the engine, for utilization as a motor and for maintaining the temperature of the engine above the point of condensation within the cylinder; and my present improvements are directed to the development of power in a gas-engine having such a boiler-incasement.

My invention embraces a combined gas-engine, steam-generator, and pump or air-compression cylinder, in the operation of which steam is admitted, under pressure, to the power-cylinder to start the engine, and subsequently also a charge of air under compression and a charge of combustible gases are admitted to continue the development of power, in which operation steam from the boiler-incasement is utilized as an independent power, and the whole power of the engine will be continued in operating the pump in compressing air within the compressor for the purpose of supplying air to the power-cylinder to assist in driving it and the air-compressor, and for other purposes. In this method of operating a gas-engine the air-compression cylinder is inclosed by a water-jacket to prevent being unduly heated, and its piston is operated by the piston of the power-cylinder. While the boiler-incased engine is thus described as being combined with and used to drive an air-compressing pump, I can also use the same method of developing power to drive a hydraulic pump, an elevator-engine, or donkey-engine.

Referring to the accompanying drawings, Figure 1 represents in vertical longitudinal section the boiler-incased engine, the pump or air-compression cylinder directly connected with the power-piston, and an independent steam-generator connected with the boiler-incasement of the power-cylinder; Fig. 2, a top view, showing the boiler-incased engine and the air-compressor connected with the engine-shaft, and the gear-connection for operating the valves for the admission of steam, air, and combustible to the power-cylinder; Fig. 3, a vertical cross-section through the boiler-incased engine and its valve-ports; Fig. 4, a vertical section taken through the valve system on the line $x\ x$ of Fig. 3, showing the pipes for the admission of air, steam, and combustible to their respective valve-ports; Fig. 5, a horizontal section on the line $y\ y$ of Fig. 3; and Fig. 6, a horizontal section of the boiler-incased engine, showing the flue-space for the escape of the waste gases and the arrangement of fuel-jet pipes, by which the boiler-incasement flue-space is made the receiver for combustible fuel for producing combustion therein to generate steam for starting the engine, in place of the independent boiler shown in Fig. 1.

The power-cylinder C of the engine is surrounded by a steam-tight casing, M, into which water is admitted as to a steam-boiler. The casing is filled to a point where it is desired maintain the water-level, and sufficient space is provided into which steam can collect, as in the steam-space of a boiler. The boiler-incasement is provided with the necessary gage-cocks, feed apparatus, and other appliances necessary to a steam-boiler. The heat radiated and conducted through the walls of the engine and through the walls of the waste-heat flues passing through the water-space of the incasement is communicated to the water within the incasement, and thus produces steam therein.

In Fig. 1 the engine-cylinder C is shown with its piston P' and piston-rod connections, and the casing M completely enveloping the cylinder, so as to form a surrounding space for the water, which is indicated by W, and is maintained at a level therein to envelop the cylinder and leave a space at the top of the casing communicating with a dome, D, within which the steam collects.

The piston-rod P³ passes through one end of the cylinder and its casing by a stuffing-box connection. Any suitable feed-water connections may be made with the casing, which is provided with suitable steam and water try-cocks, G.

The waste-gases after being discharged from the cylinder, pass through the flues F, arranged within the water-space, preferably at the lower side of the cylinder, and escape at E, as shown in Figs. 3 and 6.

The air-compression cylinder C' is surrounded with a water-jacket, C², to keep the engine from too great heat, and its piston P² is, in the example shown, connected to the rod P³ of the power-cylinder piston. The air is compressed in the cylinder C' and passes up into the air-chamber R by the pipes A' A², which communicate with the cylinder near each end, and, passing through the water-space, open by valves v v into the air-chamber R, from which the compressed air passes by the pipe A³ into the gas-engine through the proper valved ports, while the pipe A conducts compressed air from said chamber R, where it is required for other use in operating machinery run by compressed air. The pump-cylinder is provided at each end with suitable valved inlet-openings, w, for the air to be compressed.

I have shown the air-compressor piston as being connected with and driven by the piston of the power-cylinder, a piston being on each end of the rod and the cylinders in line, and the piston-rod connected by a cross-head, I, between the cylinders, and connecting-rods with crank-pins J J of the power-transmitting shaft L, which is provided with a balance-wheel, N, at each end; but it is obvious that the power-cylinder piston can be connected to the engine-shaft L by a connecting-rod and crank, and that the pump-piston may also be connected to the same shaft by an independent rod and crank, and effect the same object. In such connection of the pistons the cranks can be placed at an angle of thirty degrees to each other to equalize the forces in the two cylinders, so that the two cylinders will combine to operate as stated.

The pipe A³ connects the air-chamber R with the engine-passages d d, and the valves b b, operated by the tappets b' b', admit the charge of air and combustible into said chambers, the fuel-pipe E', Fig. 4, being arranged to enter the said air-pipe A³, so as to deliver the gaseous fuel within the flowing volume of air, so that the compressed air and the gas enter the engine-passage together.

The pipe S' connects the pipe S of the steam-dome D of the boiler-incasement with a passage, r, which communicates through valves a a with the engine-passages d d, and the valves a a, operated by the tappets a' a', admit the charge of steam into the engine-passages, from whence, with the air and combustible admitted at the same moment, the complete charge enters the power-cylinder through the port o, according to the stroke of the piston. The waste gases are discharged through the ports o o into the passage c², and thence into pipes F' F' by the outlet-valves c c, and thence into and through the flues F of the boiler-incasement, said outlet-valves being operated by the tappets c' c', which, with the valve-operating tappets a' b', are arranged upon the shaft H, which is revolved by bevel-gear e f from the engine-shaft. Any suitable cut-off may be made to control the operation of the cams and valves.

As a starting-motor, I may use an independent steam-boiler, B, communicating with the dome D and with the pipe S' of the steam-inlet valves a a, to supply the steam required to start the power-piston; or for this purpose I may use the boiler-encasement of the engine by providing means for supplying combustible fuel and jets of air arranged to heat the boiler-incasement when it is desired to start the engine. In Fig. 6 such an arrangement of fuel-pipe E' and air-jet pipes J' J' is shown, the combustion being effected within the flue-space F, through which the waste gases are discharged after giving up their heat to the boiler.

In using the independent steam-generator B to start the engine the steam is first admitted to the power-cylinder and drives the engine and the air-compressor. As soon as it is desired to start the combustible fuel a sufficient quantity of air and combustible is admitted to the power-cylinder with the steam through the first portion of the stroke of the piston, and is then ignited. The heat of this combustion increases the pressure of the mingled air and steam, and the force thus developed is utilized in driving the piston, the same operation taking place upon the return-stroke. The gas-engine now being in operation, the boiler-incasement will now begin to develop steam by absorbing the waste heat of the engine. Steam from the boiler-incasement can now be used as a power to assist in driving the engine, either in connection with the independent boiler or by itself alone. When steam from the boiler-incasement is used alone the operation is as follows: At each stroke of the piston a quantity of air and combustible is admitted to the power-cylinder with an amount of steam from the boiler-casing. The charge being now ignited, the piston is driven, and the waste heat rejected by the engine develops an additional amount of steam in the boiler-casing, to be utilized in continuing the operation of the engine.

Since a large portion of the gaseous fuel is composed of hydrogen, the products of the combustion of the fuel will be largely steam, and in gas-engines which are cooled by a water-jacket the hot aqueous vapor within the cylinder is rapidly condensed by contact with the cylinder-walls, the rise in temperature being sudden, caused by the explosion of the combustible mixture, followed by an instantaneous fall of temperature and pressure. This is due to the fact that the gases are ignited within a comparatively cold chamber, which is practically a condenser, and the sudden fall is due to the almost instantaneous condensation of the aqueous portions of the products of combustion.

By combining the boiler-incasement with the power-cylinder it is obvious that the engine-cylinder cannot have a temperature lower than that of the surrounding steam, and hence the products of combustion cannot condense so rapidly, and in any case the aqueous portion of the charge will not have a lower temperature than that of the steam in the boiler-incasement. The absorption of the heat, therefore, from the charge by the cylinder-walls will be very much slower, and the work done by the gases in the engine-cylinder will be correspondingly greater; hence if we make no disposal of the steam generated in the boiler-incasement, but allow it to escape through a safety-valve into the air and be lost, a great benefit would still result in the increased efficiency of the engine.

When starting steam in the boiler-incasement the gaseous fuel will be injected, under pressure, in jets, the issuing-orifices of which are shown as being within pipes Z, through which the force of the fuel-jets draws in a sufficient quantity of air to secure its combustion.

When in operation the whole power of the engine is applied to work the pump, and when for compressing air the amount will be much larger than is required to make up the charge of air in the engine; hence all the excess of the quantity required to supply the gas-engine is available for use for other purposes as a power.

By thus using one compression-cylinder to perform both offices of supplying the power-cylinder and to compress the quantity of air required for use, I am enabled to make a very simple air-compressor, which will act efficiently and will adapt itself to the conditions of use, for if it be required to furnish compressed air at a high pressure the air-supply to the gas-engine will also have this high pressure, and the power-cylinder will therefore be working under favorable conditions to develop the power required to compress the air to the point required; but if it be required to work, compressing the air to a less pressure, then the air supplied to the cylinder will be correspondingly less, and the compressor will be working under conditions favorable to the development of less power.

In driving the pump by placing its piston upon the piston-rod of the power-piston the full power of the latter in working the pump and a very compact construction are obtained.

It will be understood that the several pipe-connections for the supply of steam, air, and gaseous fuel are provided with suitable stop-cocks.

It will also be understood that when operating a working-cylinder other than an air-compressor, such air-compressor may then be operated from the engine-shaft to supply the air to the power-cylinder.

Having thus particularly described the construction and operation of my combined gas-engine and air-compressor, it will be understood that an important matter of my invention is combining the power-cylinder of a gas-engine of any kind with an air-compression cylinder by the direct connection of their pistons or with the engine-shaft, for the purpose of compressing air, as set forth. In this combination there are many advantages, for since a gas-engine requires a supply of compressed air as one of the constituents of the charge, the engine is by such combination applied to a work which furnishes the required product of compressed air to supply the power-cylinder, leaving the excess for other use.

By thus using a gas-engine and an air-compression cylinder having such relation to each other that all the power of the engine is exerted in compressing air in said cylinder I am enabled to use a portion of the power of the engine in forming a charge for its cylinder instead of obtaining such supply from a cylinder constructed to supply air for the charge only. In such combination the amount of work done in the compression-cylinder is in its effect a self-acting governor for the working of the engine.

In the operation of my invention to compress air it is not necessary to alter or adjust the point of cut-off to develop more power, as in other gas-engines, for if the engine is required to compress the air to a higher degree, then the charge will have a greater compression and the engine will thus instantly adapt itself to the new conditions of higher power required. Illustrating the matter of increased compression and consequent increased power, suppose the compressor to be running and compressing air at a given pressure, now let the supply of fuel be increased. The engine will immediately develop more power, and the effect of this additional power will be to compress the air to a higher point; hence the next charge in the power-cylinder will be under greater compression and more power will be developed to be again exerted in the compression-cylinder, producing still higher compression, which again reacts in the power-cylinder, and so each succeeding charge will be under greater compression until a point of equilibrium is reached. It will then be seen that by combining the compression-cylinder with the power-cylinder and taking a portion of the compressed air to make up the charge and devoting the whole power of the engine in compressing air I have produced a new and very advantageous combination, in which, in making up the charge, the required amount of compressed air may be used in an engine devoting its whole power in compressing air, leaving the balance for other use. An identical result would be obtained if the air was compressed in two cylinders instead of one, provided they both discharge their excess of air into a pipe, to be conducted where required for use. So in like manner a compression-engine can be constructed on this plan, using two or more power-cylinders and two or more compression-cylinders, and if the charge is made up with compressed air, which is part of the work product of the engines, such construction will be included in my invention.

In the operation of the power-cylinder and its incasing-boiler the steam generated by the waste heat of the engine is first admitted to the cylinder for starting the engine, and then introduced as a separate power with the charge of fuel to be burned within the cylinder. In this particular the operation of the engine is a complete and distinct thing without reference to the work it does, while in the combination of a gas-engine and an air-compression cylinder any kind of engine may be used.

In the drawings I have shown the independent steam-generator as being placed between the engine and its power-transmitting shaft; but it is not intended to so place it.

In the application made by me for a patent hereinbefore referred to for a gas-engine having its power-cylinder combined with a boiler-incasement the steam so generated is utilized to drive an independent steam-engine, whereas in my present invention the steam generated in the boiler-incasement is utilized as a force to aid in driving the boiler-incased engine, thus practically operating the engine by steam and by gas at the same time and in the same cylinder, both forces operating independently to develop power.

The construction shown in Fig. 6 is particularly adapted to drive an elevator by generating the steam by the combustion of gas within the flue-space F by the jets J J, ignited in any suitable manner. When a given pressure is attained within the incasement a governor operated by the pressure of the steam will lessen the quantity of gas supplied to said jets J J, so that the pressure of the steam will never rise above the given pressure. If such pressure falls, the governor will supply more combustible to the jets J J; hence there will always be a pressure of steam in the dome D, ready to start the engine, no matter how long it has been idle. The engine thus started, its operation is continued by steam, air, and combustible. As long as the engine runs, the steam will be generated within the casing by the heat from the engine, and by a suitable governor for the steam cut-off the pressure in the boiler-casing may be maintained. When the engine is stopped the jets J J will be used to keep a small flame to avoid relighting them, and to insure there being always a sufficient pressure of steam to start the engine when required.

In the connection of the two boilers, valves are so placed in the connecting-pipes that steam can be supplied either from the boiler B or from the dome D independently or from both together.

I have shown and described a fuel-conducting pipe combined with a system of air and gas valves; but it is obvious that the combination of gas-engine and air-compressor, as described, is not necessarily confined to this system of introducing the gaseous fuel to the engine.

The admission of the steam into the cylinder of the gas-engine from its boiler-incasement is controlled by the cock $s^2$ in the pipe S', while the admission of the steam into said engine-cylinder from the independent boiler is controlled by the cocks $s^3$ and $s^2$ in the pipes S and S', the steam from either generator being so admitted through the valves $a\,a$. (Shown in Fig. 4.) The admission of the steam to the cylinder as a starting-power or with the charge of air and combustible may be effected by any form of valve or cut-off device in use in steam-engines.

A cock, $a^3$, may be placed at any point in the air-pipe $A^3$; but such cut-off is not a necessity in the operation of the engine, since the power-cylinder will take only the amount of compressed air required for the charge and leave the balance for use to be delivered by the pipe A; but cocks may be placed at any point of a pipe-connection when desired to control the pipe-line at various points.

The employment of steam within the power-cylinder of an engine in which steam and air are continuously admitted to a burning fuel within said cylinder has been proposed, the fuel being caused to burn throughout the first part of the stroke of the piston. In such proposed use of steam in the operation of a gas-engine the steam and air have not been admitted through a given portion of the stroke of the piston and then ignited, and it is therefore impossible in such method of using steam to employ it as an independent power to start an engine operated by air, gas, and steam, as I have specifically claimed as my improvement.

My invention relates to gas-engines in which an explosive mixture is ignited at a given part of the stroke of the piston, and it is not adapted to admit steam and air to a continuously-burning charge of fuel within the power-cylinder.

In my method of operating a gas-engine, live steam is introduced into the cylinder from a boiler by suitable valves to start the engine, and subsequently a charge of air and combustible is admitted by a system of air and gas valves and ignited to continue the developement of power by using the direct pressure of the exploded gases of separate charges upon the piston.

An air-compressor has also been combined with a gas-engine, in which the cylinder of the compressor has been arranged in the axis of the working-cylinder of the engine with the pistons of both cylinders upon the same piston-rod; but the air so compressed is used to operate a third power-transmitting engine—that is to say, it has been proposed to employ an explosive gas-engine solely and entirely to operate an air-compressor piston to draw the air within the compressor, and to employ the air compressed to operate a separate engine. Moreover, in such combined gas-engine and air-compressor the return-stroke of the piston of the gas-engine is effected by the pressure of outside air, and the air is compressed by such return-stroke of the piston, whereas in my invention the power-cylinder is charged with a small portion of the air compressed by it, and the engine is operated by the direct pressure of the exploded gases upon the piston to effect both strokes thereof, and the air so compressed is used to form a part of the charge of the working-cylinder, and the greater portion is utilized to do other work.

I claim—

1. The combination of a double-acting gas-engine with an air-compressor, a pipe, $A^3$, connecting the air-storing chamber of said compressor with the valve system of the engine, suitable air and gas controlling valves, a fuel-pipe, E, arranged to enter said air-conducting pipe, and the pistons of the engine and the air-compressor having direct connection with the power-transmitting shaft of the engine, substantially as described, for the purpose specified.

2. The combination, in a gas-engine, of the power-cylinder and an air-compressor, each having a suitable valve system, and the pistons of each having direct connection with the power-transmitting shaft of the engine, with the pipe $A^3$, connecting the air-storing chamber of said compressor with the valve system of said engine, and the pipe A, also communicating with said air-chamber, substantially as described, for the purpose specified.

3. The combination of a gas-engine and a boiler-incasement therefor with an air-compressor having a water-jacket, suitable valves for the engine and air-compressor, the pipe $A^3$, connecting the air-storing chamber with the valves of the engine, and means, substantially such as described, for connecting the pistons of the engine and the air-compressor with the power-transmitting shaft, substantially as described, for the purpose specified.

4. The combination of a gas-engine, a boiler-incasement therefor, and flues or passages for the escape of the waste gases from the engine, with means, substantially such as described, for producing combustion within said flue-space, for the purpose specified.

5. In combination, in a gas-engine, the power-cylinder, the boiler-incasement therefor, the flues or passages for the escape of the waste gases, arranged within the water-space of said boiler-incasement, and the fuel and air injecting pipes arranged within said flue-space, whereby to form a combustion-chamber within the said boiler-incasement, for the purpose specified.

6. The combination of the working-cylinder of a gas-engine, enveloped by a boiler, with an air-compressor enveloped by a water-jacket, the connected pistons, the pipes $A^3$ and $E'$, the valves of the engine, and their operating-shaft, all constructed and arranged for co-operation in a gas-engine and air-compressor, substantially as described, for the purpose specified.

7. The combination, with a double-acting gas-engine, a boiler-incasement therefor, the flues or passages for the escape of the waste gases from the engine, the fuel and air injecting pipes arranged within said flue-space, and suitable valves for admitting steam, air, and combustible into said cylinder, of an air-compressor having its air-storing chamber connected with the valve system of the engine, and a pipe for carrying off the surplus air under compression, substantially as described.

In testimony whereof I have hereunto set my hand in the presence of two subscribing witnesses.

LEWIS HALLOCK NASH.

Witnesses:
 CHRISTOPHER C. WHITTEMORE,
 WILLIAM C. WESTERVELT.